United States Patent [19]

Granryd

[11] 4,326,668

[45] Apr. 27, 1982

[54] LOW COST VEHICLE TRACTION DEVICE EMPLOYING PIVOTALLY MOUNTED ANCHORING MEANS

[76] Inventor: Thorvald G. Granryd, 825 N. Sheridan, Lake Forest, Ill. 60045

[21] Appl. No.: 140,176

[22] Filed: Apr. 14, 1980

Related U.S. Application Data

[63] Continuation-in-part of Ser. No. 253, Feb. 5, 1979, Pat. No. 4,225,082.

[30] Foreign Application Priority Data

Jun. 19, 1979 [AU] Australia .............................. PD9241

[51] Int. Cl.³ .............................................. B60C 27/00
[52] U.S. Cl. .................................................... 238/14
[58] Field of Search ........................... 238/14; 152/222

[56] References Cited

U.S. PATENT DOCUMENTS

| | | | | |
|---|---|---|---|---|
| 3,279,700 | 10/1966 | Britschgi | ................................ | 238/14 |
| 3,512,613 | 5/1970 | Peterson | ................................. | 238/14 |
| 3,672,422 | 6/1922 | Greipel | ................................. | 238/14 |
| 3,918,638 | 11/1975 | Nelson | ................................. | 238/14 |

*Primary Examiner*—Richard A. Bertsch
*Attorney, Agent, or Firm*—August E. Roehrig, Jr.

[57] ABSTRACT

Vehicle traction devices for passenger cars and alike including a flexible belt-like traction mat with transverse corrugations on one side and substantially smooth on the other side. In one embodiment, one end of the mat is secured to anchoring means including a flexible anchoring pad and ground gripping element. In another embodiment, the mat is secured to a bridge having cleats for anchoring the device to the ground.

In use, the traction mat is first arranged to form a loop relative to the anchoring means. With its corrugations facing a tire and its smooth side facing the ground, the traction mat will easily be drawn under a spinning wheel until that end of it, which is secured to the anchoring means, becomes choked by the anchoring means. The tractive effort then developed causes the anchoring means to become wedged and thus assuring its fixed position, whereby the traction mat is prevented from being propelled away by the driven wheel.

12 Claims, 12 Drawing Figures

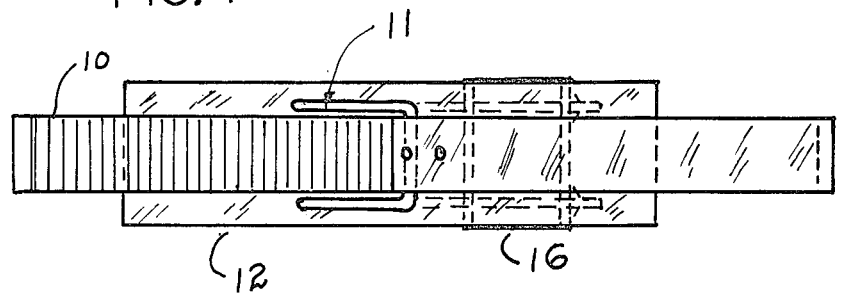
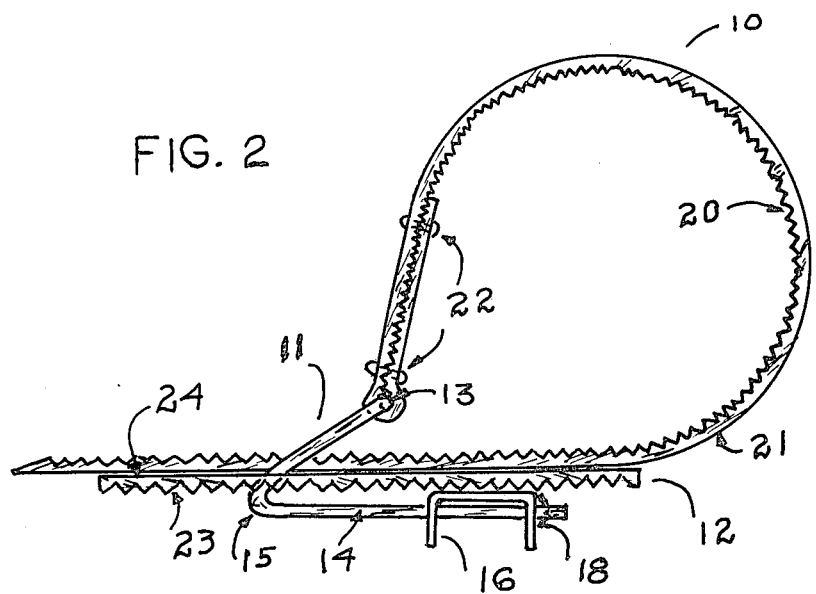
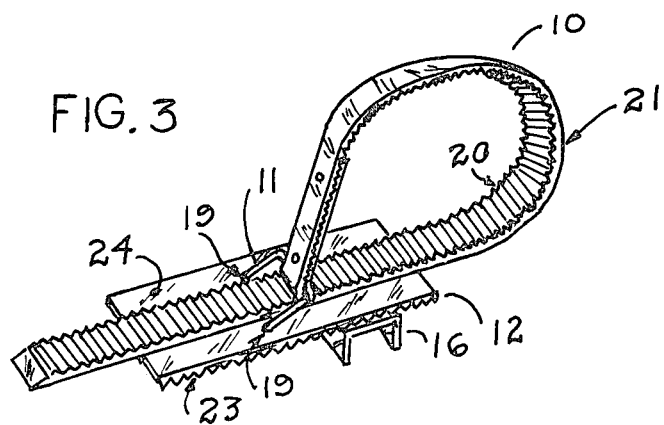

LOW COST VEHICLE TRACTION DEVICE EMPLOYING PIVOTALLY MOUNTED ANCHORING MEANS

BACKGROUND OF THE INVENTION

This is a continuation-in-part of my co-pending application, Ser. No. 000,253, entitled Low Cost Vehicle Traction Device Employing Pivotally Mounted Anchoring Means and filed Feb. 5, 1979 and now U.S. Pat. No. 4,225,082.

This invention relates in general to auxiliary vehicle traction aid for rubber tired vehicles intended to be used in case such a vehicle lacks sufficient ground adhesion—due to snow, ice, etc.—to propel itself.

More specifically, this invention relates to a traction aid having a belt-like traction mat and an anchoring means pivotally connected thereto in one embodiment. In a second disclosed embodiment, a traction mat is secured to a bridge adapted to be anchored to the ground.

Prior art teaches numerous configurations for devices to this general kind; however, most such devices comprise a great plurality of parts and/or require substantial tooling expenditures, factors which adversely affect their commercial acceptance.

SUMMARY OF THE INVENTION

It is, therefore, an object of this invention to improve upon traction aids for rubber tired vehicles.

Another object of this invention is to obtain a traction aid comprising few and low cost elements and requiring minimum of tooling expenditures for fabrication.

These and other objects are attained in accordance with the present invention wherein two embodiments of a readily available matting and anchoring means are arranged in novel combination to assure effective operation.

DESCRIPTION OF THE DRAWINGS

Further objects of the invention, together with additional features contributing thereto and advantages accruing therefrom, will be apparent from the following description of several embodiments of the invention when read in conjunction with the accompanying drawings wherein:

FIG. 1 is a top plan view of a first embodiment of a traction device of the invention as intended for a passenger car or alike.

FIG. 2 is a side elevational view of the same device.

FIG. 3 is a perspective view of the device in position prior to use.

DESCRIPTION OF THE PREFERRED EMBODIMENTS

Figure 4:
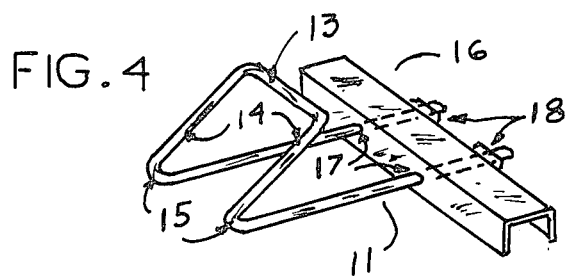
FIG. 4 is a fragmentary perspective view of frame and gripping means of the same device.

Referring first to FIGS. 1 and 2, there is shown one embodiment of the traction device of the invention having a traction mat 10 rotatably mounted at its one end onto an anchoring frame 11. The configuration of frame 11 is best shown in FIG. 4. Also fastened to frame 11 is an anchoring pad 12 shown in FIGS. 1, 2 and 3.

Referring to FIG. 4—in which the pad 12 is omitted for clarity—there is shown frame 11 and ground gripping element 16 secured thereto. Frame 11, formed from round stock spring steel, has a lateral portion 13 and two parallel portions 14, each having an acute bend 15. Gripping element 16, comprising a bar of commercially available steel U-channel, is provided with holes 17, through which the two portions 14 of frame 11 are inserted. Element 16 is securely fastened to portions 14 by push-on type spring nuts 18, a fastener frequently utilized in industry.

Referring again to FIGS. 1, 2 and 3—in assembly of the device anchor pad 12, having holes 19, is slid onto frame 11 to the bend 15 prior to installing gripping element 16. Traction mat 10, rotatably mounted at its one end, not numerated, to lateral portion 13 of frame 11 by means of rivets 22, comprises a strap of rubber type belting. It has transverse corrugations on its one side, 20, while substantially smooth on its other side, 21. Such belting is readily commercially available and used in conveyor belts, automotive timing belts etc. The width of mat 10 is such that it is narrower than the inner distance between the portions 14 of frame 11, allowing free movement there between. For proper functioning mat 10 is less than the tread width of a tire and it has been found that it performs satisfactorily even at a width as small as two inches. The length of mat 10 is such that it will comfortably extend under the full length of tire foot print of a mired wheel.

Anchoring pad 12, likewise to mat 10, comprises the same type of material, and having transverse corrugations on its lower side 23 and being substantially smooth on its upper side 24. Its width is greater than that of mat 10 to accommodate for its fastening to frame 11 and to provide surface area for anchoring. Its maximum width, as is the length of gripping element 16, is restricted by practical considerations only.

From the foregoing description, the device comprises only four main components: mat 10, frame 11, pad 12 and gripping element 16, all of which are obtained from low cost, commercial hardware.

Figure 5A:
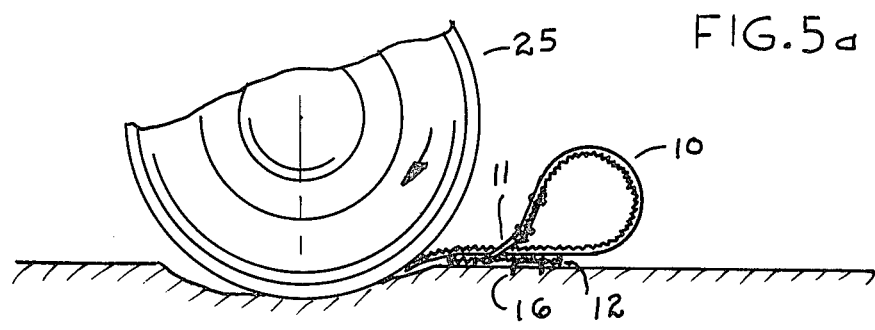
FIGS. 5a, 5b, 5c are side elevational views of the device illustrating sequence of events while in operation.
Figure 5B:
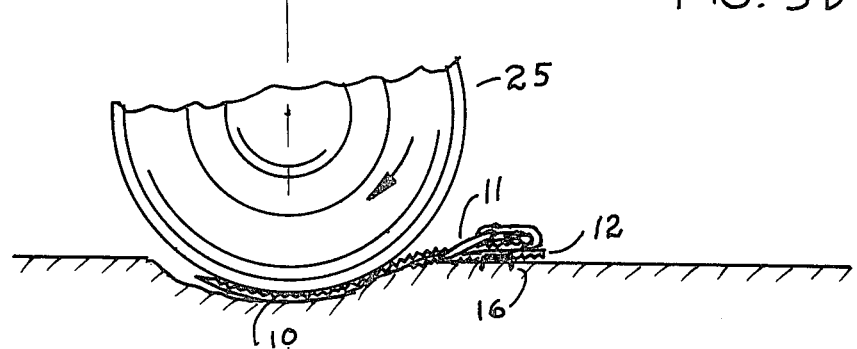
Figure 5C:
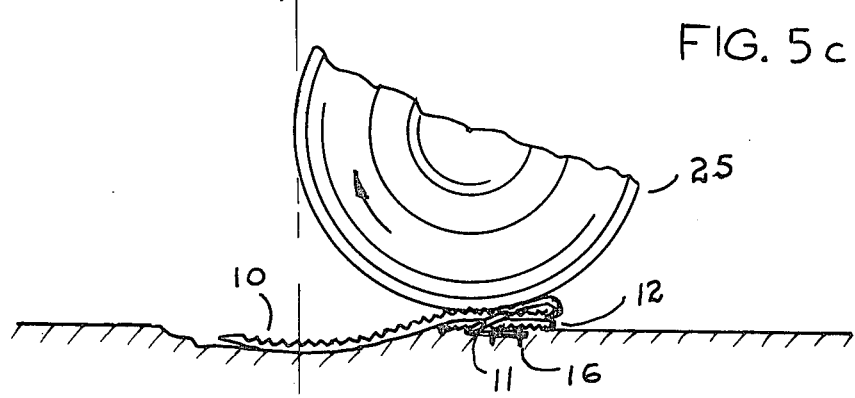

The operation of the device is shown in FIGS. 5a, 5b and 5c and illustrated in conjunction with a driving tire 25. It should be noted that most generally the device is used in pair, one placed by each of two driving wheels.

In FIG. 5a, the device is shown placed on that side of a mired wheel, toward which the wheel is to be moved. With the device in configuration as shown in FIGS. 2 and 3—the free end of mat 10 is pushed into contact with tread of tire 25 and pad 12 is placed adjacently as shown in FIG. 5a. The loop-like configuration of mat 10 is caused by it being constrained; in its relaxed state the mat 10 will be flat or take on a larger radius of curvature. Thus, it will offer no resistance to be straightened as when drawn under the tire 25 as it begins to rotate. Contributing further to engagement of mat 10 toward under the tire 25 are the smooth surfaces 21 and 24 of mat 10 and pad 12, respectively.

FIG. 5b shows how the loop-like configuration of mat 10 has disappeared; as the tire 25 has begun to rotate, and thus, the rotatably mounted end of mat 10 has been choked against the pad 12. At this phase, the pad 12, the frame 11 and the gripping element 16 has begun to experience strain, causing an initial anchoring force.

As the tractive effort, created by the rotating tire 25 and the corrugated surface 20 of mat 10, continues—the choked end of mat 10, the anchoring pad 12, the frame 11 and the gripping element 16 became increasingly wedged between the tire 25 and the ground. Eventually, tire 25 will pass onto these means, thrusting them further into the ground as shown in FIG. 5c. As this phase is reached, secure anchoring of new footing has been attained, thus assuring that tire 25 is being moved from its predicament.

Figure 6:
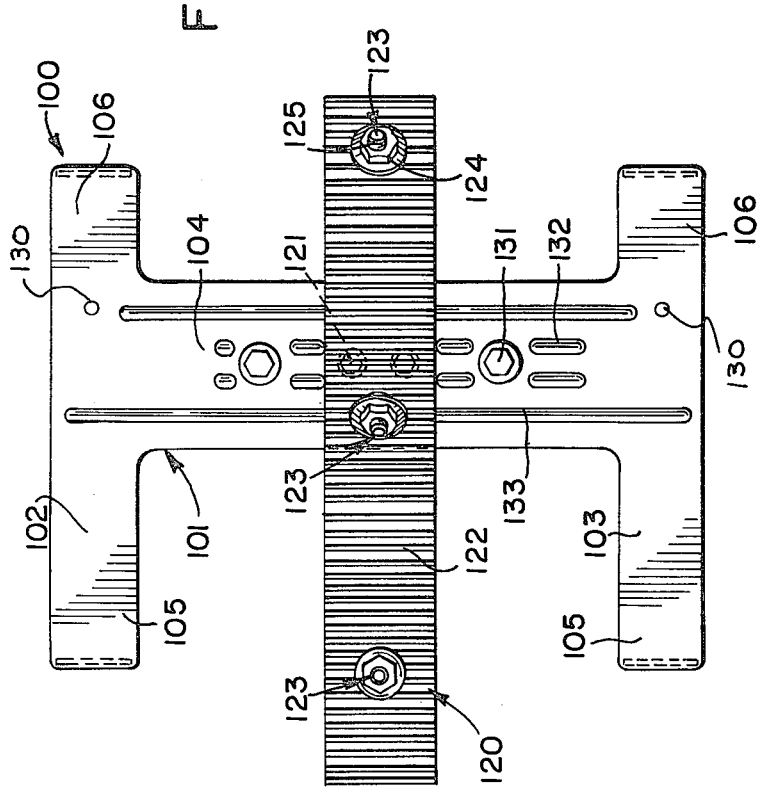
FIG. 6 is a top plan view of another embodiment of the traction device of the invention.
Figure 7:
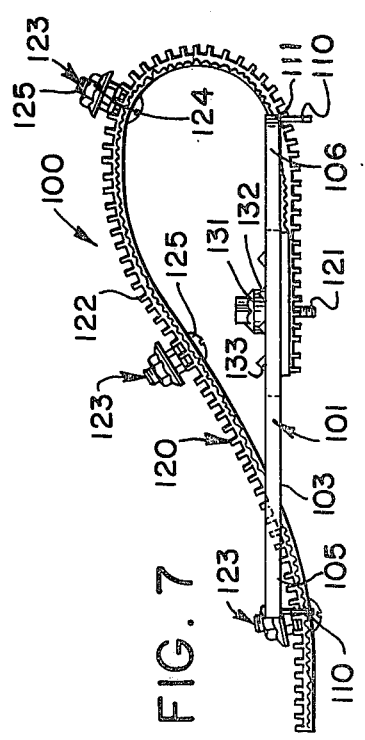
FIG. 7 is a side elevational view of the traction aid of FIG. 6.

Referring now to FIGS. 6 to 8c, there is illustrated another embodiment of the traction device of the invention, generally designated by reference numeral 100. As shown in FIGS. 6 and 7, the traction device 100 includes a bridge 101 in the form of an H-bar having a relatively flat design. Although the bridge 101 can be fabricated from a number of suitable materials, the use of an injection molded high density polyethylene has been found to be a useful construction. The polyethylene material exhibits adequate stiffness in use, but is sufficiently flexible to inhibit breakage, even at low temperatures.

The bridge 101 includes a pair of legs 102 and 103 interconnected by a connecting section 104. The width between the legs 102 and 103 of bridge 101 is designed to be sufficient to straddle even the largest of commonly encountered vehicle tires. The length of legs 102 and 103 is selected to be of a magnitude to cause a lever effect in use of traction device 100. The forward portions 105 of legs 102 and 103 are projected for a greater length from intermediate section 104 than the aft sections 106. The fore and aft ends of legs 102 and 103 include downwardly directed flat cleats 110 at each end, which are retained in slots 111 extending perpendicular to the longitudinal axis of legs 102 and 103 as best shown in FIG. 7. The cleats 110 function to anchor the bridge 101 in a manner to be described.

One end of a traction mat 120, in the form on an elongated elastomeric belt, is attached to a center portion of the upper surface of the connecting section 104 of bridge 101. The end of the traction mat 120 is anchored to the bridge by a pair of bolt assemblies 121, such as flanged cap screws, or other suitable attachment means. The screws 121 are of a length sufficient to dig into the ground as a vehicle wheel passes over the bridge 101. The traction mat 120 which may be of any other suitable traction-enhancing configuration, includes transverse corrugations 122 on one side, while the opposite side of the traction mat 120 is substantially smooth.

A plurality of gripper assemblies 123 are positioned in spaced relationship along the longitudinal extent of the traction mat 120. Any number of gripper assemblies 123 are employed in conjunction with the invention dependent on the length of the traction mat 120 and desired gripping results. The gripper assemblies 123 are in the form of nut plus flanged bolt assemblies 124 having threaded shafts 125 which project above the corrugated side 122 of the mat 120 by a selected distance. The heads 126 of bolt assemblies 124 include a truss head design for smoothness, and lie in flush contact with smooth surface of the mat 120 as shown in FIG. 7. The gripper assemblies 123 provide enhanced traction characteristics of the upper side 122 of the mat 120 as will be apparent.

The bridge 101 includes one or more holes 130 for receiving a string, wire, and the like (not shown) to attach the bridge 101 to a structural part of a vehicle and carry the traction device to a more accessible position subsequent to the vehicle being driven from its immobile position. The top of the bridge 101 is formed with a plurality of molded grippers 131, 132 and 133, which protrude upward in spaced relationship from the upper surface of the bridge connecting section 104. The grippers 131, 132 and 133 relieve strain on the mat 120 in its final stage of extricating the vehicle. The grippers 131 are spaced in proximity to each other so that even a tire having a small width will pass over the grippers.

Figure 8A:
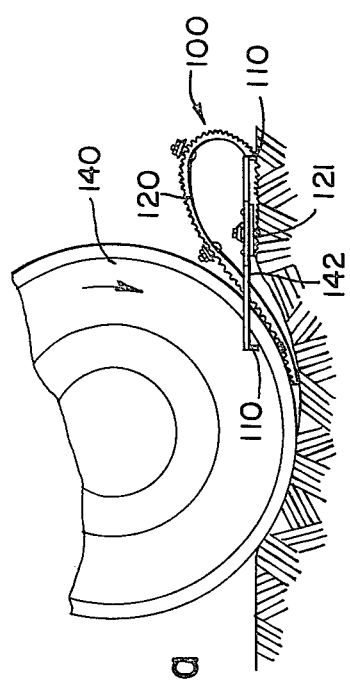
FIGS. 8a, 8b and 8c are side elevational views of the traction aid of FIG. 6 illustrating sequence of events while in operation.

In operation of the embodiment of the traction device described with reference to FIGS. 5 and 6, the bridge 101 is positioned in front of a tire 140 of a vehicle as shown in FIG. 8a. It is generally advantageous to employ a traction device 100 adjacent both vehicle drive wheels because of the differential assembly normally provided on vehicles. In the position illustrated in FIG. 8a, the longer forward portions 105 of the bridge 101 are arranged with their forward ends projecting beyond the periphery of the tire 140 in a straddling relationship. The mat 120 is bent in a looped configuration from the bridge to orient the free end of the mat 120 adjacent the ground and the wheel 140 with the corrugated side 122 of the belt 120 forming an upper traction surface. The belt 120 is pushed against the tire while the bridge 101 is moved to straddle the tire to a position leaving enough clearance 142 between the connecting section 104 and the tire to permit the belt 120 to be freely driven under the tire as it spins as shown in FIG. 8a.

Figure 8B:
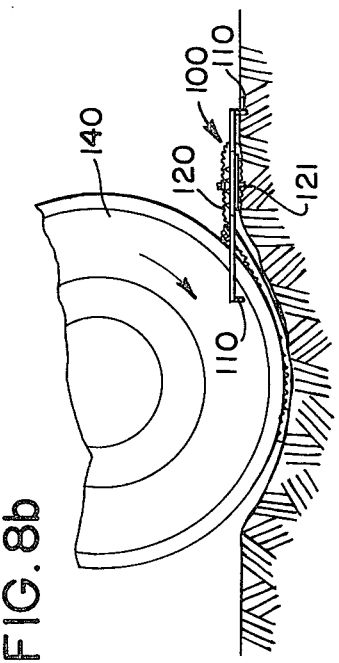
Figure 8C:
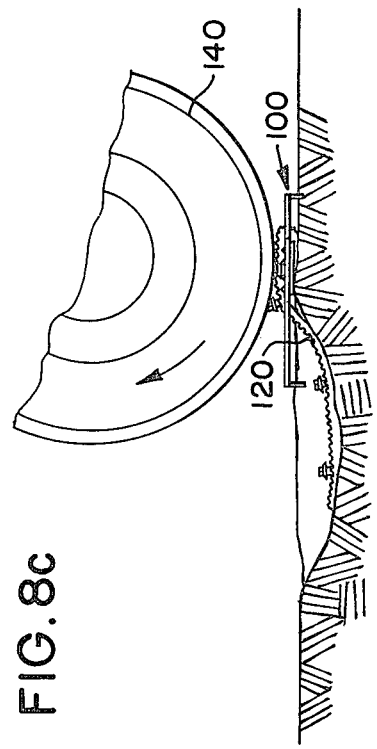

From the position shown in FIG. 8a, the spinning wheel 140 will pull or draw the mat 120 entirely under the wheel as illustrated in FIG. 8b. The corrugated side 122 of the belt 120 and the gripper assemblies 123 act together to provide superb traction for the wheel, while the smooth underside permits the belt to be drawn under the tire until it is restrained or "choked" from further extension by the bridge 101. The weight on the vehicle wheel 140 will strain the belt 120 to push the bridge 101 downward and drive the cleats 110 into the ground to anchor the bridge 101. During the initial drawing of the belt 120 beneath the tire as shown in FIG. 8a, a downward force is applied to the bridge 101 to drive the front pair of cleats 110 located on the longer section of the bridge 101 into the ground, because of the downward force being applied thereto through the belt 120. As the wheel 140 continues rotation, it directly contacts the bridge 101 to bias all four cleats downward into anchoring. In FIG. 8c, the traction provided by the mat enables the wheel to establish frictional engagement and move away from an immobile position. The molded grippers 131, 132 and 135 formed on the bridge 101 aid in extricating the vehicle during movement of the wheel thereover. The weight of the vehicle drives the end portions of the screws 121 into the ground to assure adequate anchoring as the driven wheel passes over the bridge 101.

While the invention has been described with reference to the preferred embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that that the invention will include all embodiments falling within the scope of the appended claims.

What is claimed is:

1. An assembly for providing a traction surface under the drive wheel of a vehicle comprising base means adapted to be positioned adjacent to a drive wheel of a vehicle, said base means including cleat means adapted to engage the surface supporting the drive wheel of the vehicle and anchor said base means, elongated flexible traction means having a first end affixed to said base means, said elongated traction means including a first surface having a friction enhancing surface for contacting with the driving wheel and a second surface having a substantially smooth surface for contacting with the surface supporting the drive wheel, said elongated flexible traction means having a free end portion adapted to be positioned adjacent the drive wheel of the vehicle between the drive wheel and said base means, said elongated flexible traction means being looped upon itself between the first end affixed to said base means and the drive wheel of the vehicle through at least a portion of said base means during positioning of said free end portion adjacent the drive wheel, and said elongated flexible traction means forming a traction surface to extricate the vehicle as said free end portion is drawn beneath the drive wheel of the vehicle with said first friction enhancing surface in engagement therewith and said second substantially smooth surface passing over the vehicle supporting surface during rotation of the drive wheel while said first end portion is anchored against movement by said base means.

2. The assembly according to claim 1 wherein said base means includes a bridge member having a pair of spaced parallel sections.

3. The assembly according to claim 2 wherein said bridge includes an H-shaped configuration.

4. The assembly according to claim 2 wherein said parallel sections are adapted to be arranged in straddling relationship to at least a portion of the drive wheel.

5. The assembly according to claim 2 wherein said elongated traction means is looped above said base means and extends between said parallel sections.

6. The assembly according to claim 1 wherein said first surface further includes at least one gripper assembly means.

7. The assembly according to claim 6 wherein said gripper assembly means includes nut and bolt assembly means.

8. The assembly according to claim 6 wherein said gripper assembly means includes flanged nut and bolt assembly means, extending above said first surface.

9. The assembly according to claim 1 wherein said first end of said elongated flexible traction means is affixed to the base means by bolt assembly means.

10. The assembly according to claim 9 wherein said bolt assembly means includes at least one shaft member projecting downward from said base means and adapted to engage the vehicle support surface to aid in anchoring said base means.

11. The assembly according to claim 1 wherein said base means includes a plurality of upper spaced projections positioned on the top surface of said base means.

12. The assembly according to claim 1 wherein said cleat means includes a plurality of flat members having a sharp edge oriented downward.

* * * * *

UNITED STATES PATENT AND TRADEMARK OFFICE
CERTIFICATE OF CORRECTION

PATENT NO. : 4,326,668

DATED : April 27, 1982

INVENTOR(S) : Thorvald G. Granryd

It is certified that error appears in the above—identified patent and that said Letters Patent is hereby corrected as shown below:

In column 3, line 45, delete "on" and substitute therefor -- of --;

In column 4, line 44, delete "on" and substitute therefor -- of --; and

In column 5, line 7 delete "that".

Signed and Sealed this

Tenth Day of August 1982

[SEAL]

Attest:

GERALD J. MOSSINGHOFF

Attesting Officer    Commissioner of Patents and Trademarks